(12) United States Patent
Ryerson et al.

(10) Patent No.: US 6,408,871 B1
(45) Date of Patent: Jun. 25, 2002

(54) TWO WAY PRESSURE RELIEF VALVE

(75) Inventors: Michael R. Ryerson, Fall River, MA (US); Paul E. Moody, Barrington, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 111 days.

(21) Appl. No.: 09/656,198

(22) Filed: Sep. 6, 2000

(51) Int. Cl.$^7$ ............................................. F16K 17/196
(52) U.S. Cl. ..................... 137/493; 137/493.9
(58) Field of Search ............... 137/493, 493.9, 137/493.8

(56) References Cited

U.S. PATENT DOCUMENTS

| | | | | |
|---|---|---|---|---|
| 1,856,996 A | * | 5/1932 | Heise | 137/493.8 |
| 3,092,137 A | * | 6/1963 | Van Eldiik Thieme | 137/493 |
| 3,850,195 A | * | 11/1974 | Olsson | 137/493 |

* cited by examiner

*Primary Examiner*—Stephen M. Hepperle
(74) *Attorney, Agent, or Firm*—Michael J. McGowan; James M. Kasischke; Prithvi C. Lall

(57) ABSTRACT

A two way pressure relief valve for equalizing pressure between a first region and a second region. The valve has a housing with a lateral aperture in communication with the second region and a first aperture in communication between the first region and the lateral aperture. A piston assembly having an annular rim portion is retained slidably within the housing. Flutes are formed in the piston assembly for allowing fluid communication between the first region and the second region. An annular retaining piece having a second aperture therein is joined within the lateral aperture in the housing at the second region for retaining the piston assembly within the housing. A first biasing means is positioned in the housing between the first aperture and the piston assembly for biasing the piston assembly away from the first aperture. A second biasing means is positioned in the housing between the retaining piece and the piston for biasing the piston assembly away from the second region. The piston assembly prevents flow through the housing during normal operations. If a pressure differential exists between the first region and second region, the piston assembly slides in the housing allowing communication through the first aperture, flutes, lateral aperture and second aperture.

16 Claims, 2 Drawing Sheets

TWO WAY PRESSURE RELIEF VALVE

CROSS REFERENCE TO RELATED PATENT APPLICATION

This invention is related to a co-pending patent application filed on the same day entitled "TORPEDO TUBE SHUTTER-PRESSURE RELEASE" and further identified as Ser. No. 09/656,193.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates generally to valves, and, more particularly, this invention relates to a two way pressure relief valve for reducing pressure differentials across surfaces.

(2) Description of the Prior Art

Modern submarines need the capability to launch torpedoes while underway. These undersea craft usually have fairing-like structures that cover the torpedo tubes to reduce turbulence and associated hull generated noise. The structures are removed before torpedoes can be launched. The mechanisms required to move the structures may be too heavy and bulky if they must not only move the weight of the structure but also overcome the pressure created across the sides of the structures due to hydrodynamic flow over the structure's surfaces.

Thus, in accordance with this inventive concept, a need has been recognized in the state of the art for an apparatus for equalizing pressures and reducing the total force needed to open shutters covering torpedo tubes so that torpedoes may be launched while underway.

SUMMARY OF THE INVENTION

An object of the invention is to provide a valve for reducing pressure between faces of a surface.

Another object of the invention is to provide an inexpensive valve that can be operated in two directions.

Yet another object of the invention is to provide a valve that operates automatically when pressure between faces of the surface exceeds a predetermined tolerance.

These and other objects of the invention will become more readily apparent from the ensuing specification when taken in conjunction with the appended claims.

Accordingly, the present invention provides a two way pressure relief valve for equalizing pressure between a first region and a second region. The valve has a housing with a lateral aperture in communication with the second region and a first aperture in communication between the first region and the lateral aperture. A piston assembly having an annular rim portion is retained slidably within the housing. Flutes are formed in the piston assembly for allowing fluid communication between the first region and the second region. An annular retaining piece having a second aperture therein is joined within the lateral aperture in the housing at the second region for retaining the piston assembly within the housing. A first biasing means is positioned in the housing between the first aperture and the piston assembly for biasing the piston assembly away from the first aperture. A second biasing means is positioned in the housing between the retaining piece and the piston for biasing the piston assembly away from the second region. The piston assembly prevents flow through the housing during normal operations. If a sufficient pressure differential exists between first region and second region, the piston assembly slides in the housing allowing communication through the first aperture, flutes, lateral aperture and second aperture.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals refer to like parts and wherein.

DESCRIPTION OF THE PREFERRED EMBODIMENTS

Figure 1:
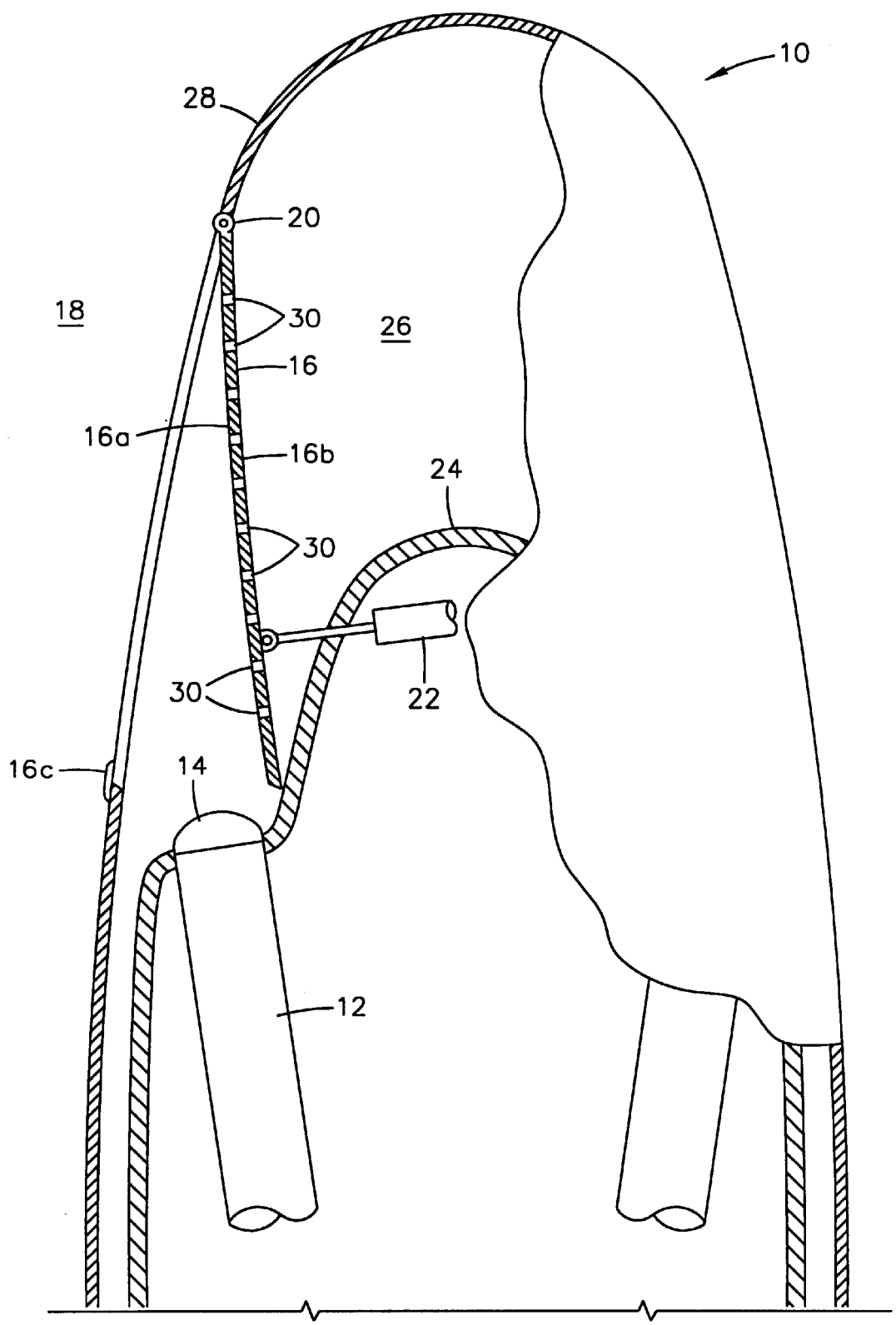
FIG. 1 schematically shows a top view of a portion of a submarine having a displaceable shutter selectively covering the muzzle door of a torpedo tube and pressure release valves in the shutter.

FIG. 1 gives the operating context of the current invention. FIG. 1 shows the torpedo launch room of a submarine 10. Each torpedo tube 12, (only one of which is fully shown) has a muzzle door 14. A shutter 16 selectively covers muzzle door 14 to function as a displaceable fairing that deflects flowing water 18 of the surrounding ocean to avoid creating excessive flow noise as submarine 10 proceeds at high speed. Shutter 16 may be mounted on a hinge 20 and is selectively, rotatably displaced by a hydraulic power cylinder mechanism 22 that may be located within a pressure hull 24. Each shutter 16 has one side 16b adjacent freely-flooded region 26 of submarine 10 and creates a streamlined, faired surface on an other side 16a with outer (non pressure containing) hull 28 when it is rotated to the closed position, and muzzle door 14 of each torpedo tube 12 is closed. When muzzle door 14 is opened and shutter 16 is rotated to the open position, a clear path is created for ordnance (not shown) to be fired from submarine 10.

Shutter 16 can either be operated independently or may be mechanically connected to the operation of muzzle door 14. In either case, the size of hydraulic power cylinder mechanism 22 to provide normal operating forces is determined by calculating the frictional drag of the mechanism of operating cylinder 22 and hinge 20, the weight of all the components involved (including shutter 16, hinge 20, and hydraulic power cylinder mechanism 22), and a safety factor incorporated to account for variations between calculated loads and actual shipboard installations. Such factors as component misalignment, wear of parts, deflections under pressure and hydrodynamic loads are accounted for by the safety factor.

In accordance with this invention it has been discovered that during transit of submarine 10, the velocity of the flow of ambient water 18 over outer hull 28 (and sea side surface 16a of shutter 16) intensifies as submarine 10 increases speed. This condition results in a pressure drop on sea-side surface 16a of shutter 16 as compared to the relatively stagnant water pressure in freely-flooded region 26 between outer hull 28 and pressure hull 24 that is also adjacent surface 16b of shutter 16. This pressure drop, or pressure differential creates an outward force on surface 16b which pushes shutter 16 snugly against shutter stop 16c while submarine 10 is underway at high speeds. While this pressure differential is small, the area of shutter 16 is large; therefore, a significant force is developed on shutter surface 16b in a direction that tends to keep shutter 16 more tightly closed.

Therefore, if shutter 16 is to be opened during these high speeds, a total force must be overcome that includes these significant and normal operating forces. A more substantial power cylinder mechanism 22 and all the associated linkage and components operated by power cylinder mechanism 22 would have to be robust enough to withstand the total force, or loads imposed on all the parts of individual pieces. During high-speed operations, the total force that must be exerted might be so substantial that it may be impossible to open shutter 16. Under such conditions, the speed of submarine 10 is slowed; shutter 16 is opened; ordnance is deployed; and submarine 10 then resumes high-speed transit. This slow down and delay procedure could create a critical tactical disadvantage.

In accordance with this invention a plurality of two-way, pressure release valves 30 are included in shutter 16 to eliminate, or alleviate, the pressure differential across shutter 16 that is caused by water 18 flowing over it during high-speed travel of submarine 10. Pressure release valves 30 provide a flow path between both sides, or surfaces 16a and 16b of shutter 16 that will eliminate the pressure imbalance caused by high-speed transit. When this pressure imbalance is eliminated, the force to displace shutter 16 is lessened. In addition, pressure release valves 30 of this invention do not create unacceptable noise sources as compared to the objectionable levels of flow noise generated by numbers of simple holes drilled through shutter 16. Making pressure release valves 30 from strong and non-corrosive or corrosion resistant materials assures long-term, automatic trouble-free operation.

Figure 2:
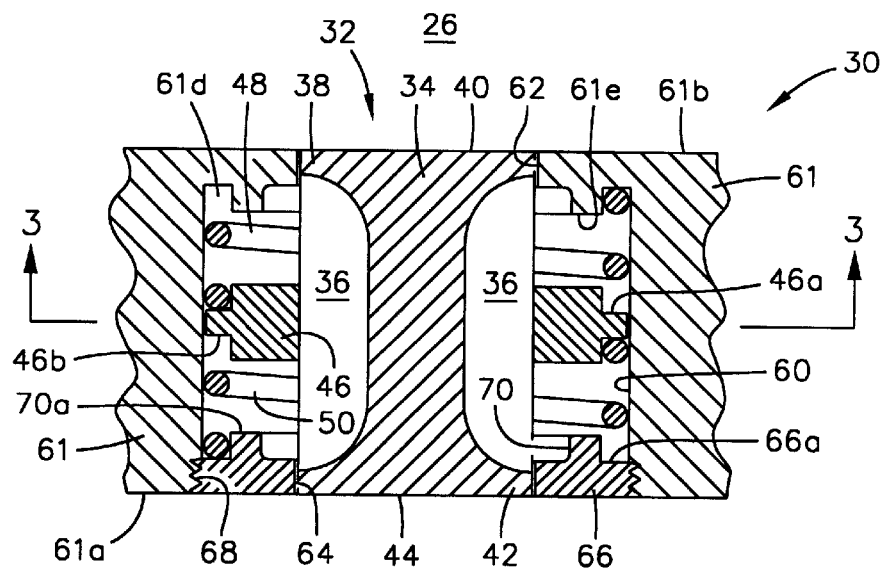
FIG. 2 is a cross-sectional side view of a pressure release valve during a condition of balanced pressure on both sides of the housing.
Figure 3:
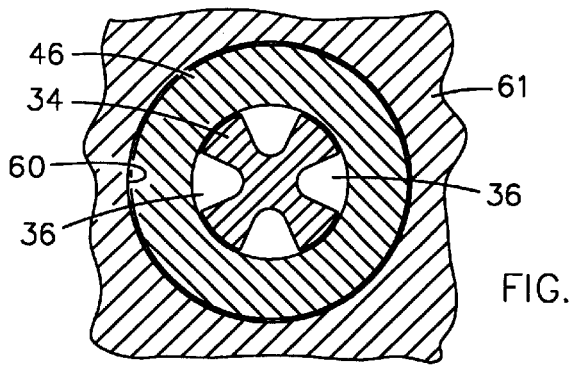
FIG. 3 is a cross-sectional view of the pressure release valve taken along line 3—3 in FIG. 2.

Referring now to FIGS. 2 and 3, each pressure release valve 30 has a piston assembly 32 disposed in a lateral bore 60 in a housing 61 which can be shutter 16. Sides 16a and 16b of shutter can be sides 61a and 61b of housing 61. Piston assembly 32 is a displaceable, essentially elongate, cylindrically shaped component that has central shaft portion 34 provided with four elongate flutes 36 machined in an equal-distantly, circumferentially spaced relationship to extend parallel with the axis of central portion 34. First end portion 38 of central shaft portion 34 extends through first bore 62 in housing 61 to locate end surface 40 coplanar with surface 61b of housing 61. First end portion 38 is sized to slidably fit within first bore 62 to permit its axial reciprocal displacement in first bore 62. Second end portion 42 of central portion 34 extends through second bore 64 in annular retaining piece 66 to locate end surface 44 coplanar with surface 61a of housing 61. Second end portion 42 is sized to slidably fit within second bore 64 to permit its axial reciprocal displacement in second bore 64.

Lateral bore 60, first bore 62, and second bore 64 are coaxially aligned. As shown, first bore 62 has a diameter smaller than that of lateral bore 60. Second bore 64 also has a smaller diameter which can be equal to that of first bore 62. While they are identified as "bores", lateral bore 60, first bore 62, and second bore 64 are apertures formed in the associated part by any means known in the art.

Piston assembly 32 is retained in lateral bore 60 by annular retaining piece 66 which is screwed (or bolted) into threaded recess 68 that is adjacent lateral bore 60. Retaining piece 66 may be secured in threaded recess 68 by interposing a strong adhesive before tightening retaining piece 66. Spacer ring 70 of selectively different thickness may be provided when needed under retaining piece 66 so that an adjustment is available to position end surface 44 of second end portion 42 coplanar with surface 61a. Piston assembly 32 is provided with annular rim portion 46 that extends radially outwardly from central shaft portion 34 and is sized to slidably fit within lateral bore 60 to permit its axial reciprocal displacement in lateral bore 60. Annular rim portion 46 has a greater diameter than first bore 62 and second bore 64, so that piston 32 is retained within lateral bore 60. First coiled spring 48 helically extends around central shaft portion 34 and is held compressed between annular recess 61d in housing 61 and annular shoulder 46a in annular rim portion 46. Second coiled spring 50 helically extends around central shaft portion 34 and is held compressed between annular shoulder 46b in annular rim portion 46 and annular recess 66a in annular retaining piece 66.

Under normal operating conditions as shown in FIG. 2, springs 48 and 50 are coiled about central portion 34 respectively to exert outward biasing forces between annular recess 61d and annular shoulder 46a, and between annular shoulder 66a and annular shoulder 46b. These biasing forces hold outer end surface 40 in the same plane as surface 61b and outer end surface 44 in the same plane as surface 61a.

Figure 4:
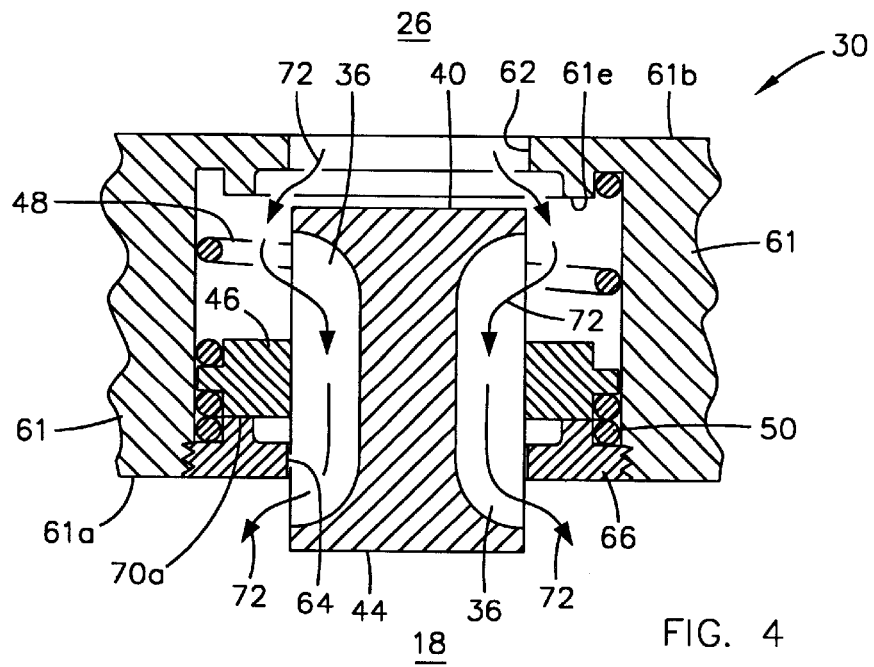
FIG. 4 is a cross-sectional side view of a pressure release valve during a condition of unbalanced pressure, or pressure differential across valve showing flow of water from the higher-pressure side of the valve to a lower pressure side of the valve.

Referring to FIG. 4 in combination with FIG. 1, when a differential pressure is created between end surfaces 40 and 44 of central shaft portion 34 of piston assembly 32, the differential pressure axially displaces central shaft portion 34 downward. Springs 48 and 50 are chosen to restore piston assembly 32 while allowing equalization of pressure. As this axial displacement occurs, spring 48 is flexed to be extended; spring 50 is flexed to be compressed; opposite ends of flutes 36 in central shaft portion 34 are exposed to ambient water 18 and water in freely-flooded region 26; and one side of annular rim portion 46 comes to abut an upper surface 70a of spacer ring 70 (or retaining piece 66). Water flows (see flow arrows 72) from higher pressure side that is adjacent surface 61b through flutes 36. This water flow 72 passes through flutes 36 and to lower pressure region adjacent surface 61a.

Other water-flow conditions, or some other reason may cause an inverse pressure differential to be created. In this case, the inverse pressure differential will flex biasing springs oppositely to the flexure described above so that spring 48 will compress and spring 50 will extend as central portion 34 of piston assembly 32 is axially displaced in the opposite, or reciprocal direction to open the flow of water in the opposite direction as indicated for water flow 72. In other words, as this axial opposite displacement occurs, spring 48 is flexed to be compressed; spring 50 is flexed to be extended; opposite ends of flutes 36 in central shaft portion 34 are exposed to water in the first region and water in the second region; and the other side of annular rim portion 46 comes to abut an internal surface 61e of housing 61. The opposite directional flow of water is through flutes 36 in the opposite direction as water flow 72 to balance the pressures. Thus, piston assembly 32 of two-way pressure release valve 30 of this invention is capable of bi-directional, or reciprocal excursions and flow to permit compensation of bi-directional pressure differentials. Two-way valve 30 is unattended and frees personnel from valve operation.

Having the teachings of this invention in mind, modifications and alternate embodiments of this invention may be fabricated to have a wide variety of applications in other systems. Many different materials for fabrication of the constituent components could be incorporated to accommodate diverse load requirements without departing from the scope of this invention.

The disclosed components and their arrangements as disclosed herein all contribute to the novel features of this invention. This invention provides a reliable and cost-effective two-way pressure release valve for equalizing pressure between two regions. Therefore, pressure release valve 30, as disclosed herein is not to be construed as limiting, but rather, is intended to be demonstrative of this inventive concept.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A two-way valve comprising:
    a valve body having a first aperture formed therein and a lateral aperture formed therein, said first aperture being coaxial and in communication with said lateral aperture;
    a retaining ring secured in said lateral aperture and having a second aperture extending through said retaining ring;
    a central portion having an annular rim portion disposed in said lateral aperture of said valve body, a first end portion at one end of said central portion provided with a first end surface extending in said first aperture of said valve body, and second end portion at the opposite end of said central portion provided with a second end surface extending in said second aperture;
    a first biasing spring in said lateral aperture between said valve body and a first side of said annular rim portion; and
    a second biasing spring in said lateral aperture between a second side of said annular rim portion and said retaining ring, said first and second biasing springs holding said first end surface coplanar with a top surface of said valve body and said second end surface coplanar with a bottom surface of said valve body.

2. A valve according to claim 1 wherein said central portion has a plurality of elongate flutes machined therein extending parallel with the axis of said central portion.

3. A valve according to claim 2 wherein:
    said annular rim portion is sized to slidably fit within said lateral aperture of said valve body to permit its axial reciprocal displacement in said first aperture;
    said first end portion is sized to slidably fit within said first aperture in said valve body to permit its axial reciprocal displacement in said lateral aperture;
    said second end portion is sized to slidably fit within said second aperture to permit its axial reciprocal displacement in said second aperture; and
    said first aperture, said lateral aperture and said second aperture are coaxially aligned.

4. A valve according to claim 3 further comprising a spacer ring on said retaining ring to position said second end surface coplanar with said bottom surface of said valve body.

5. A valve according to claim 4 wherein a first pressure differential from said top surface of said valve body to said bottom surface of said valve body causes axial displacement of said central portion in one direction and flexure of said first and second biasing springs to expose opposite ends of said flutes to ambient water and to permit flow of water therethrough for pressure equalization.

6. A valve according to claim 5 wherein a second pressure differential inverse to said first pressure differential causes axial displacement of said central portion in the opposite direction from said one direction and opposite flexure of said first and second biasing springs to expose opposite ends of said flutes to ambient water and to permit an opposite flow of water therethrough for pressure equalization.

7. A valve according to claim 6 wherein:
    one side of said annular rim portion abuts an upper surface of said retaining ring during said first pressure differential; and
    another side of said annular rim portion abuts a surface of said valve body during said inverse pressure differential.

8. A valve according to claim 7 wherein:
    said central portion is essentially cylindrical; and
    said elongate flutes are circumferentially equidistantly spaced in said central portion to allow said flows of water therein.

9. A valve according to claim 8 wherein said retaining ring, said central portion and said biasing springs are fabricated from strong non-corrosive and corrosion resistant materials.

10. A two way pressure relief valve positionable between a first region and a second region comprising:
    a housing having a lateral aperture formed therein in communication with said second region and a first aperture formed therein in communication between said first region and said lateral aperture, said first aperture having diameter smaller than that of said lateral aperture;
    a piston assembly having a first face positioned at a first end, a second face positioned at a second end, a body portion having at least one flute formed therein, and an annular rim portion about said body portion and slidably positioned in said lateral aperture, said annular rim portion having a diameter larger than said first aperture diameter;
    an annular retaining piece having a second aperture therein joined within said housing lateral aperture between the interior of said housing and said second region, said second aperture having a diameter smaller than said lateral aperture diameter and said annular rim portion diameter;
    a first biasing means positioned within said housing lateral aperture between said piston assembly annular rim and a shoulder defined by said housing first aperture and said housing lateral aperture, said first biasing means biasing said piston assembly away from said first region; and
    a second biasing means positioned within said housing lateral aperture between said piston assembly annular rim and said annular retaining piece, said second biasing means biasing said piston assembly away from said second region;

said piston assembly having a rest position wherein said piston assembly first face interferes with communication between said first region and said lateral aperture through said first aperture and said second face interferes with communication between said second region and said lateral aperture through said second aperture, said piston assembly sliding within said housing lateral aperture in response to a pressure differential between said first region and said second region to an open position wherein said at least one flute allows communication between said lateral aperture and one of said first and second regions through a corresponding one of said first and second apertures.

11. The assembly of claim 10 wherein:

said first biasing means comprises a first helical spring; and said second biasing means comprises a second helical spring.

12. The assembly of claim 11 wherein said annular retaining piece is removable from said housing for allowing disassembly of said assembly.

13. The assembly of claim 12 wherein:

said housing has internal threads formed in said lateral aperture near said second region; and said annular retaining piece has complementary threads formed on a peripheral edge thereof.

14. The assembly of claim 13 further comprising a spacing ring positioned between annular retaining piece and second biasing means for positioning first and second faces of piston assembly coplanar with end surfaces of housing.

15. The assembly of claim 11 wherein:

said housing shoulder has an annular recess formed therein for retaining said first helical spring; and said annular retaining piece has an annular recess formed therein for retaining said second helical spring.

16. The assembly of claim 10 further comprising a spacing ring positioned between annular retaining piece and second biasing means for positioning first and second faces of piston assembly coplanar with end surfaces of housing.

* * * * *